United States Patent [19]

Hashimoto

[11] Patent Number: 4,821,311

[45] Date of Patent: Apr. 11, 1989

[54] AUTOMATIC TELEPHONE ANSWERING/RECORDING DEVICE OF DIGITAL TYPE

[75] Inventor: Kazuo Hashimoto, Tokyo, Japan

[73] Assignee: Hashimoto Corporation, Tokyo, Japan

[21] Appl. No.: 57,962

[22] Filed: Jun. 3, 1987

[30] Foreign Application Priority Data

Jun. 3, 1986 [JP] Japan .................................. 61-128396

[51] Int. Cl.[4] ............................................ H04M 1/65
[52] U.S. Cl. ......................................... 379/88; 379/67
[58] Field of Search .............................. 379/67, 88, 89

[56] References Cited

U.S. PATENT DOCUMENTS 4,514,593  4/1985  Hattori et al. ........................ 379/74
4,616,110  10/1986  Hashimoto ........................... 379/88

FOREIGN PATENT DOCUMENTS 0076688  4/1982  European Pat. Off. .
0107756  6/1983  Japan ..................................... 379/88
0107761  6/1983  Japan ..................................... 379/88
2098428  11/1982  United Kingdom .................. 379/88

Primary Examiner—Thomas W. Brown
Attorney, Agent, or Firm—Lowe, Price, LeBlanc, Becker & Shur

[57] ABSTRACT

An automatic telephone answering/recording device that is capable of storing messages sent from unspecified callers in a digital form and enabling an owner of the device to listen to the stored message quickly. The caller's messages are recorded in separate channels. Thereafter, in response to a first remote control signal sent by the owner from a remote place, each of the messages is reproduced in the order of reception, channel by channel. At this time, upon elapse of a blank portion produced following each reproduced message, a subsequent message is reproduced. Simultaneously, in response to a second remote control signal, unnecessary messages are specified and erased, and necessary messages to be stored are transferred to locations at which the erased messages were stored.

6 Claims, 15 Drawing Sheets

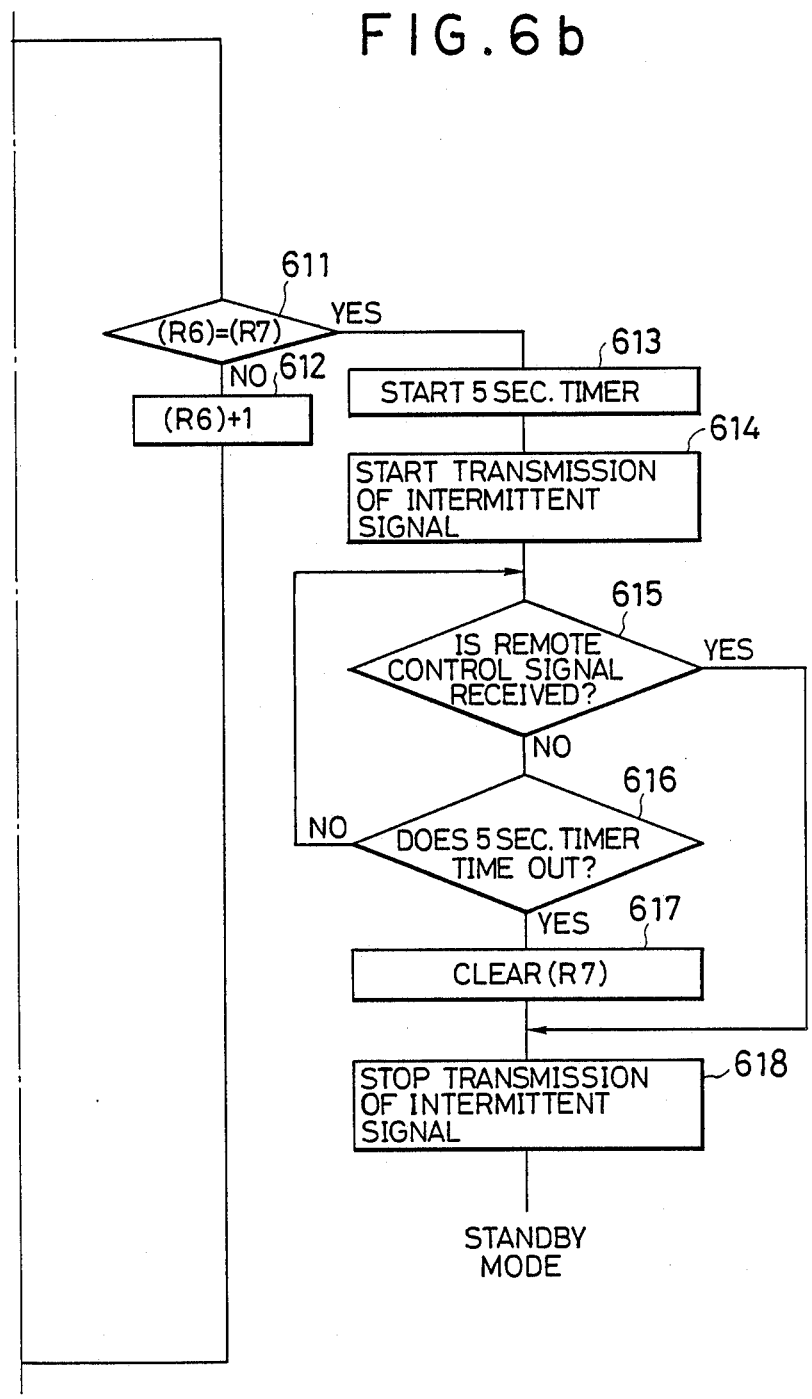

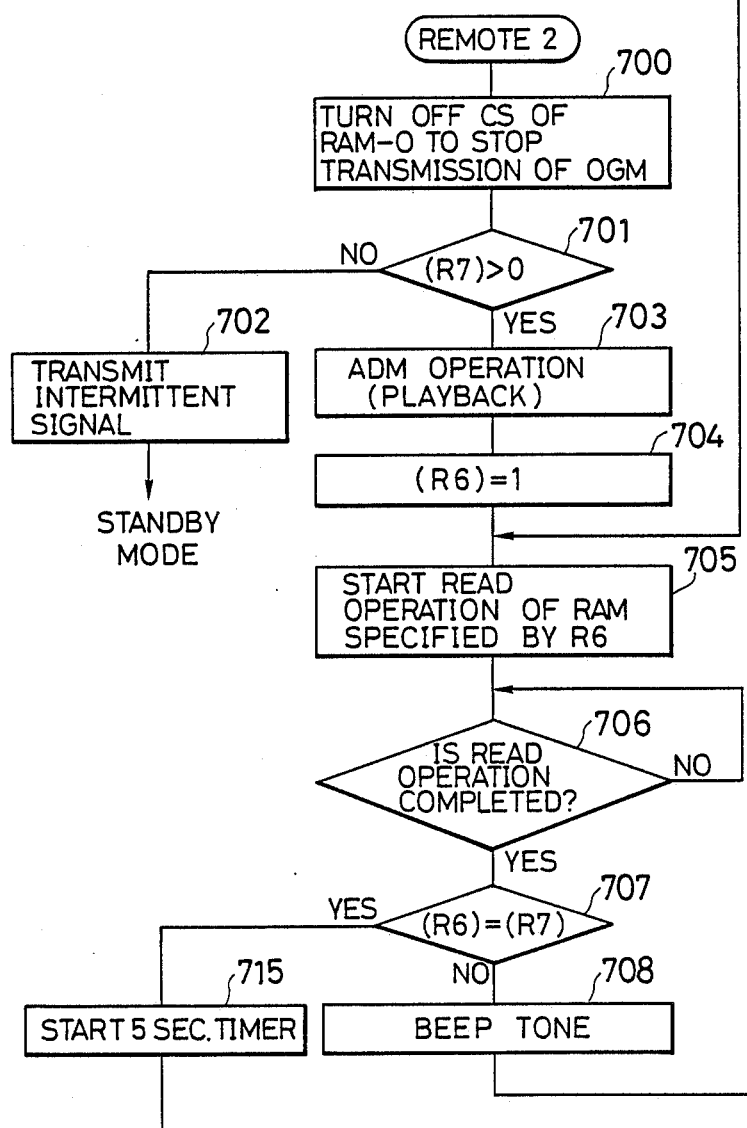

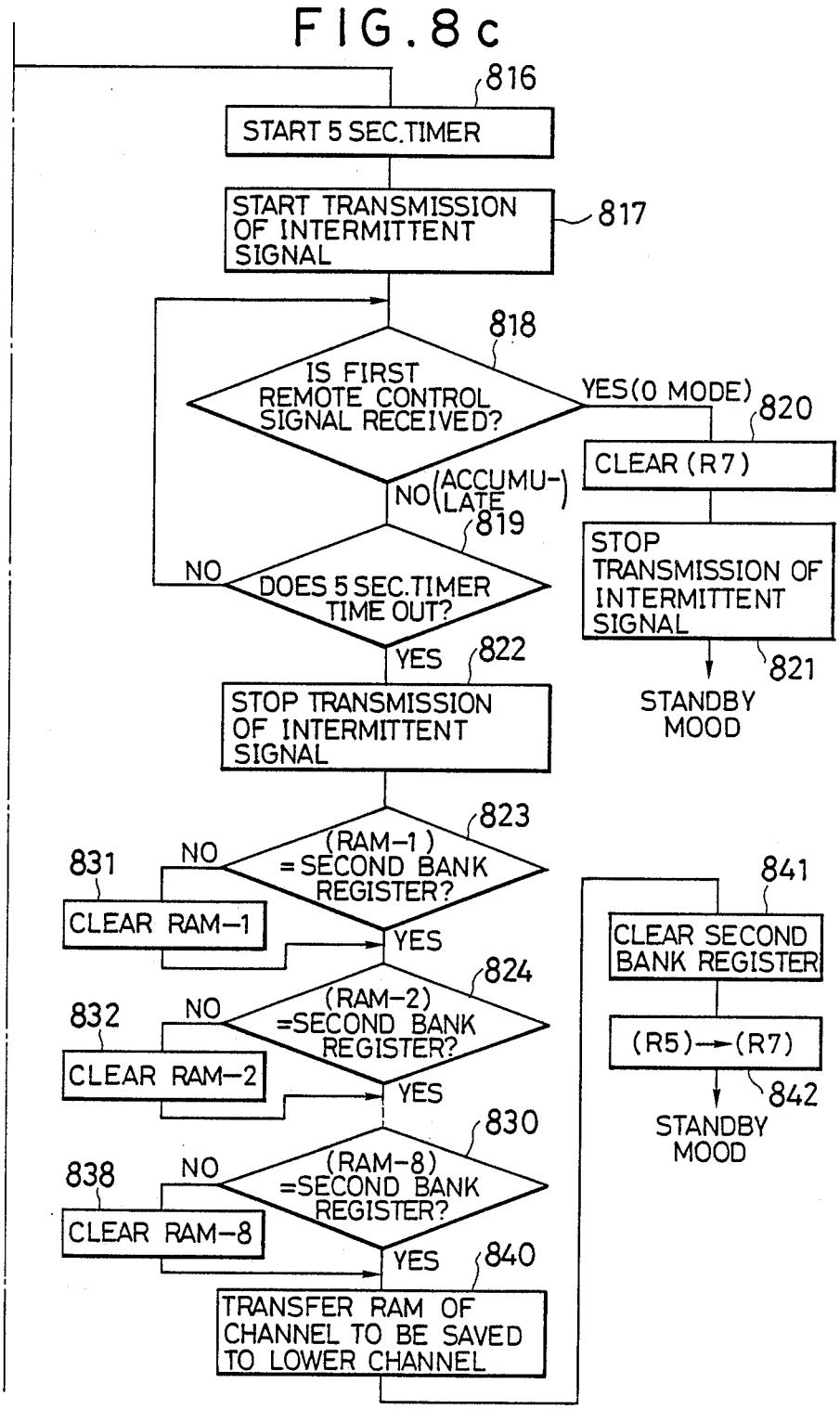

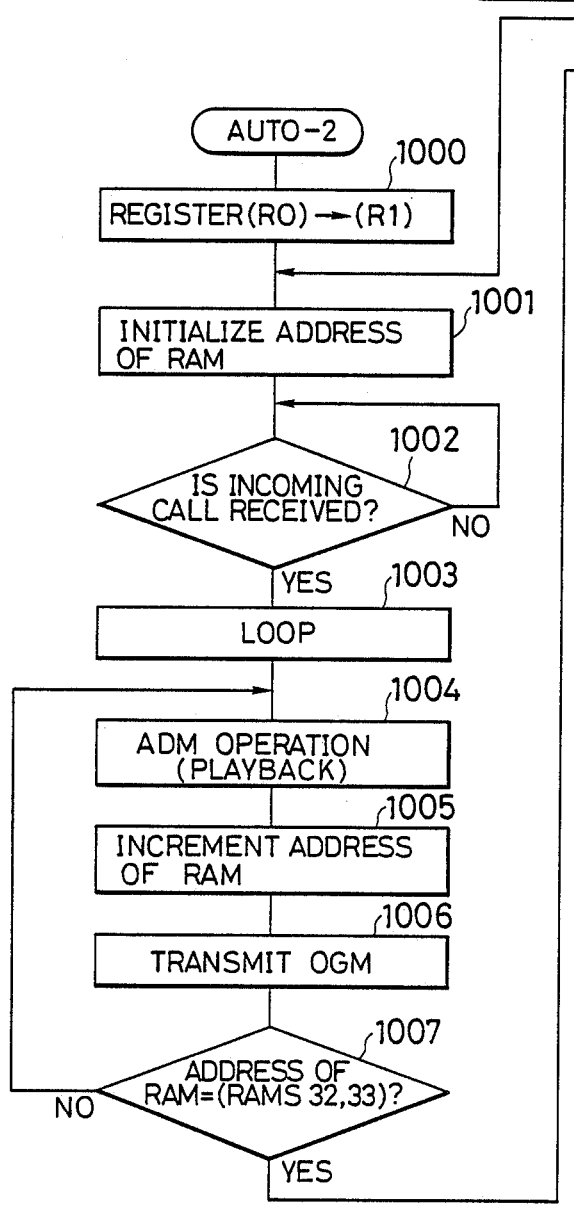

AUTOMATIC TELEPHONE ANSWERING/RECORDING DEVICE OF DIGITAL TYPE

BACKGROUND OF THE INVENTION

The present invention relates to an automatic telephone answering/recording device.

A device, which automatically responds to a telephone incoming call to effect a digital recording of a caller message, has been known in Japanese Patent Provisional Publication No. 60-21660 filed by the same applicant as that of the present application. More specifically, this device is arranged to send an outgoing message, which is recorded beforehand in a digital form by a digital synthetic operation without the need of employing a magnetic tape, and to store a voice of caller in a digital manner and playback same.

However, the prior art device of this kind is unable to allow a user at a remote place to listen to the thus recorded message by the use of remote control, resulting in inconveniences in practical use.

Summary of the Invention

A first object of the present invention is to enable a user at remote place to playback messages of his or her customers recorded in a digital form through the telephone line, in a manner sequentially specifying storage devices, i.e., integrated circuits wherein customers messages are stored in a speech synthetic form, and specifying a particular one of these devices so as to quickly read out a message recorded therein.

A second object of the present invention is to enable a user at a remote place to access integrated circuits, one or more of which each have a blank space where no message is recorded, in a manner causing a jump over the blank space of an integrated circuit to a top of a subsequent integrated circuit.

In accordance with the present invention, an automatic telephone answering/recording device of a digital type is provided, which comprises means for converting an outgoing message recorded in a random access memory, in digital form, into an analog signal for transmission thereof onto a telephone line. Means further is provided for recording messages from a number of unspecified callers in separate message channels, i.e., in memory portions having a common memory storage capacity. A further means plays back messages from a number of the unspecified callers, channel by channel, in accordance with a first remote control signal sent by an owner of the device from a remote place. A blank portion is formed between messages each time playback of a channel for a message from an unspecified caller is completed. Further means is provided for permitting playback of a message from an another unspecified caller upon elapse of the blank portion. A second remote control signal from the caller may be received each time remote listening of a message is completed, and message number storage means is provided for storing a message number corresponding to a message which needs to be stored in accordance with the second remote control signal. An erase means erases a message which is not stored in the message number storage means and does not have to be stored upon restoration of the device. Furthermore, transfer/storage means successively transfers messages specified by message numbers stored in the message number storage means to a location at which a message erased by the erase means was stored, and for saving and storing therein the thus transferred messages. Accordingly, necessary messages to be stored are transferred to locations from which unnecessary messages were erased.

The present invention is advantageous in that a user is allowed to listen to voice messages prepared by a voice synthetic operation in such a manner that the user can immediately access a top of a message if a blank space is present between this message and the preceding message, and that a telephone incoming call is rejected if all the integrated circuits are fully loaded, and that required operations can be carried out in a moment without a delay as distinct from the prior art devices. Accordingly, the present invention has excellent practical advantages and will be in popular use as a leading type of automatic telephone answering device.

The above and other objects, features, and advantages of the invention will be more apparent from the ensuing detailed description taken in conjunction with the accompanying drawings.

BRIEF DESCRIPTION OF THE DRAWINGS

FIG. 1 shows how

FIGS. 1a and 1b are circuit diagrams showing an embodiment of the present invention.

FIG. 6 shows how FIGS. 6a and 6b are related.

FIGS. 6a and 6b are a flowchart showing a remote control operation.

FIG. 7 shows how FIGS. 7a and 7b are related.

FIGS. 7a and 7b are a flowchart showing another remote control operation.

FIG. 8 shows how FIGS. 8a–8c are related.

FIGS. 8a–8c are flowcharts showing another remote control operation.

FIG. 10 shows how FIGS. 10a and 10b are related.

FIGS. 10a and 10b are a flowchart of another aspect of the second embodiment of the invention.

DETAILED DESCRIPTION

In the following, the structure and operation of automatic telephone answering/recording devices of digital type according to embodiments of the present invention will be explained.

Figure 1A:
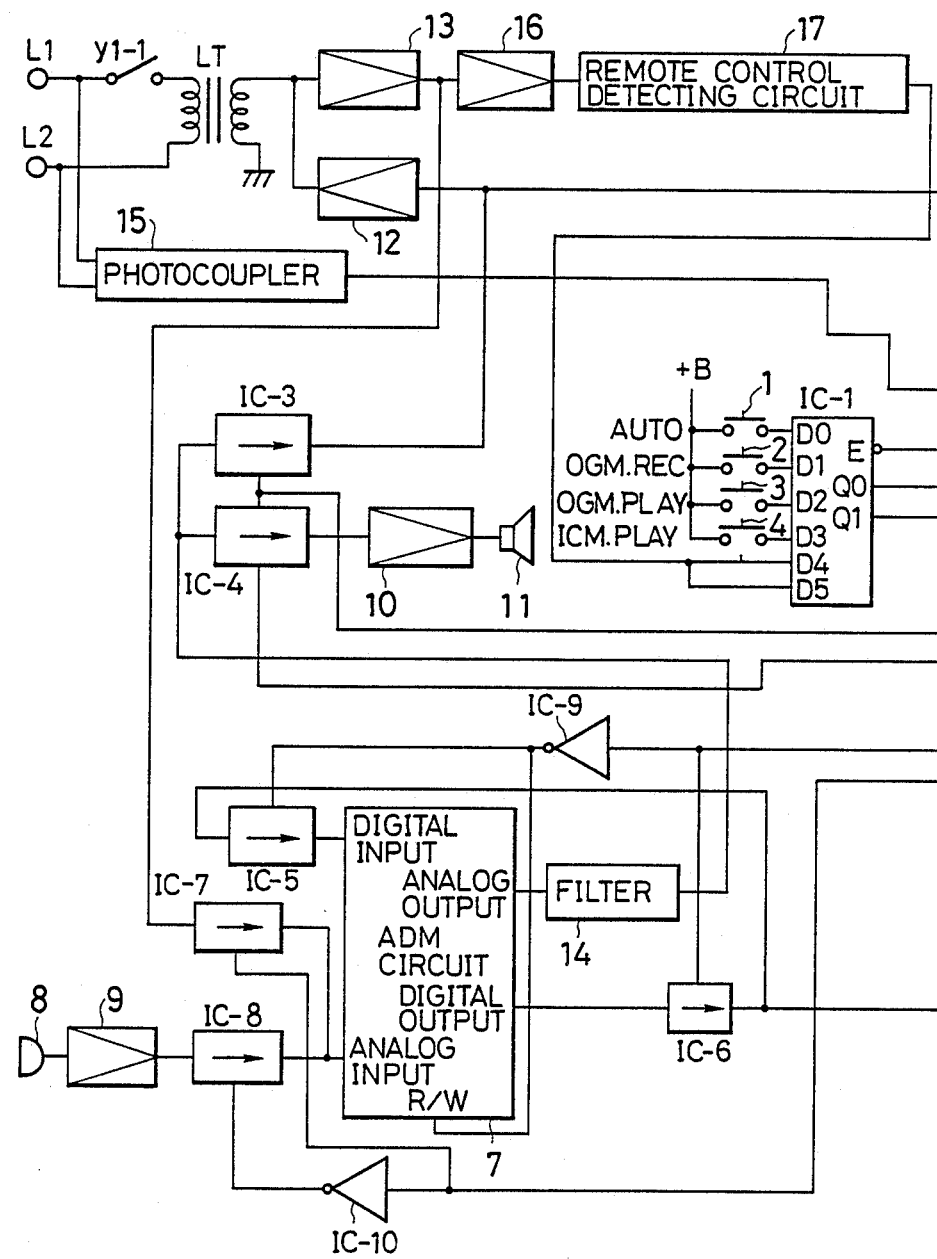
FIGS. 1a and 1b are related.
Figure 1B:
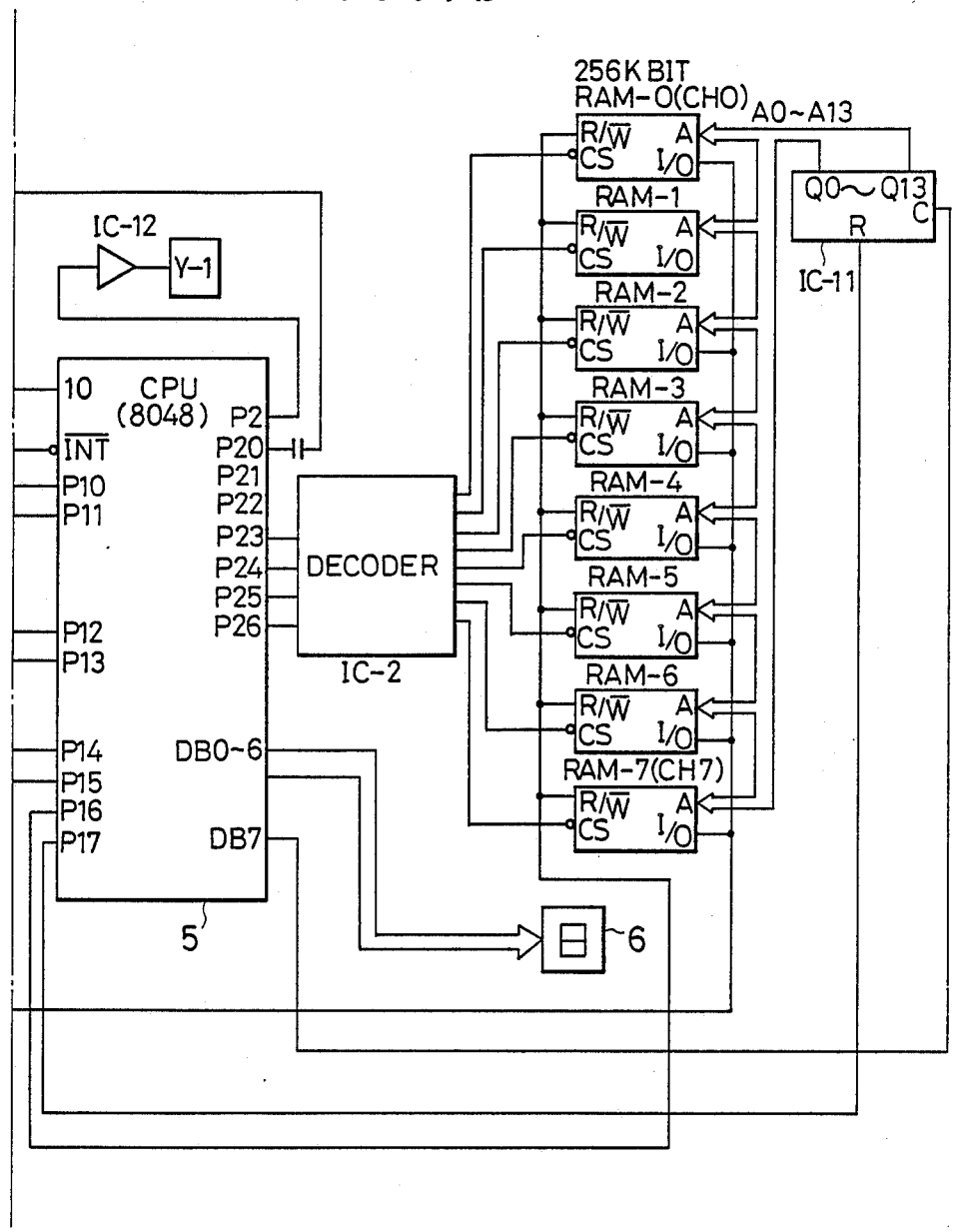
Figure 2:
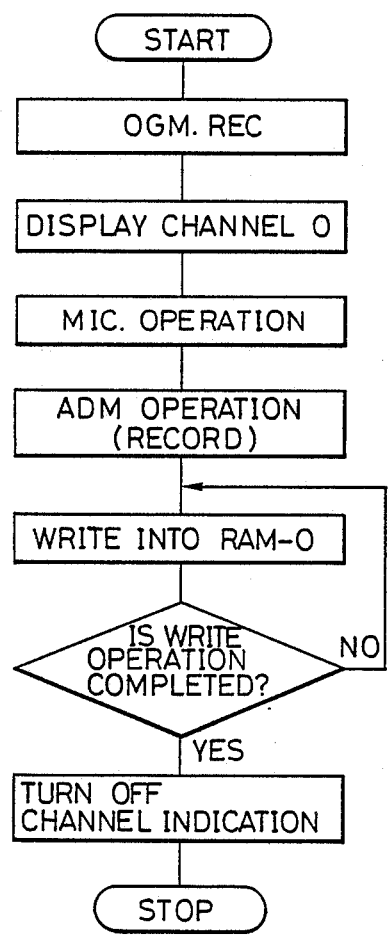
FIG. 2 is a flowchart describing an operation for recording an outgoing message.
Figure 3:
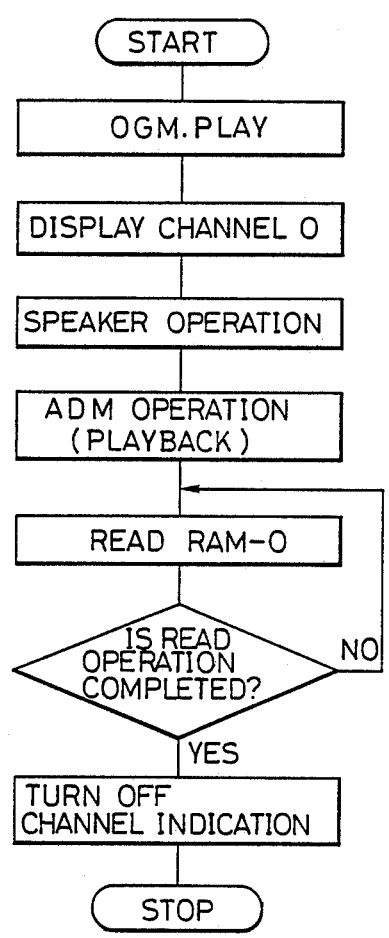
FIG. 3 is a flowchart describing an operation for playback of an outgoing message.
Figure 4:
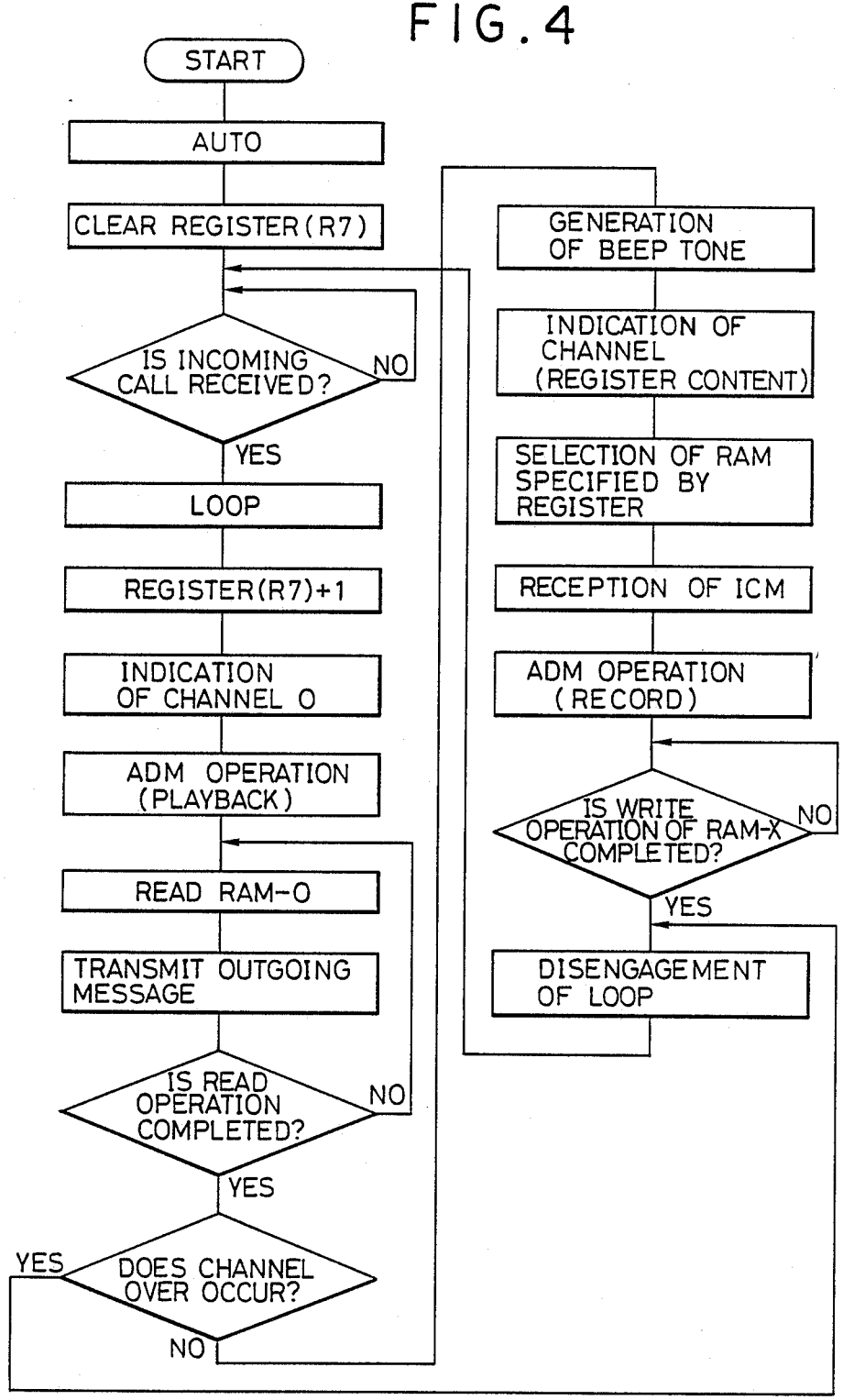
FIG. 4 is a flowchart describing how an automatic answering/recording operation is carried out.
Figure 5:
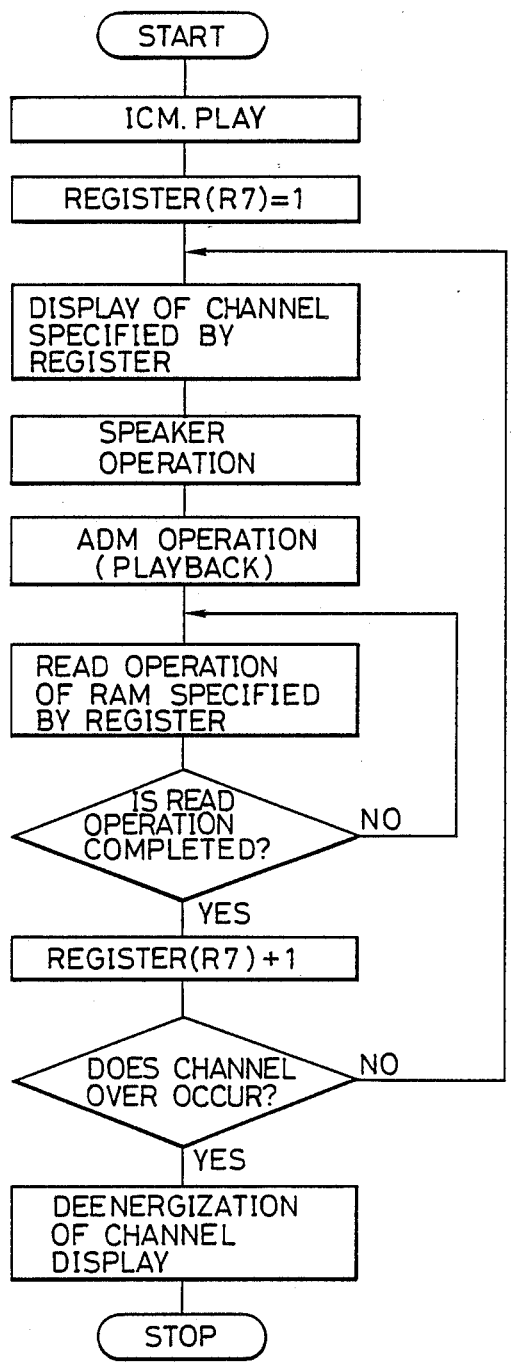
FIG. 5 is a flowchart showing manual playback operation of callers messages.

Referring to FIG. 1, reference numeral 1 denotes a push button for setting the telephone answering-/recording device in a standby mode, 2 a push button for recording an outgoing message (OGM) in a 256 Kbit random access memory RAM-O, 3 a push button for playing back the OGM, 4 a push button for playing back incoming messages (ICMs) sent from callers and recorded in 256 Kbit memories RAM-1 through RAM-7 mentioned later, and IC-1 an encoder for converting an output from these buttons into a corresponding binary signal. Further, reference numeral 5 designates a microprocessor (CPU) which is comprised of 8048 in this embodiment, the CPU having a test terminal TO for detecting a ringing signal, port terminals P10 and P11 for receiving the outputs from the buttons, and output ports P12 through P15 for operating analog switches IC-3 through IC-8 to control input/output operations of a voice waveform coding circuit (ADM) 7 mentioned later, output operations of amplifiers 9 and 13, and input operations of amplifiers 10 and 12. Further, the CPU 5 has an output port P16 for controlling read/write operations of the memories RAM-0 to RAM-7, and an output port P17 for resetting an address counter IC-11 associated with the RAMs. Data buses DB0 to DB6 of the CPU are employed as output ports an output from which is utilized to display a channel number representing which of the RAM-0 through the RAM-7 is being operated, whereas a data bus DB7 serves as an output port to supply clock signals to the counter IC-11. The above-mentioned voice waveform coding circuit 7 is usually referred to as an ADM (Adaptive Delta Modulation) circuit, which is arranged to effect sound recording/reproducing of an input voice at a bit rate of 16K into and from the memories RAM-0 to RAM-7, each of these RAMs permits the sound recording/reproducing of voice for 16 seconds. Furthermore, reference numeral 14 denotes a filter for eliminating noise which can occur when a reproduced output is supplied from the ADM circuit 7, 15 a photocoupler for detecting a ringing signal, 16 a buffer amplifier, and 17 a remote control detecting circuit, which accommodates therein, in this embodiment, a microfork for detecting a particular frequency, but may be so modified as to detect a coded remote control signal.

In the following, with reference to flowcharts of FIGS. 2 through 6, the operation of the present device constructed by the above-mentioned parts will be explained in detail.

At first, when the OGM REC button 2 is depressed to record an outgoing message, an associated data is supplied to the input ports P10 and P11 of the CPU 5 through the encoder IC-1, and at the same time an interruption request is supplied to the CPU through the INT terminal. At this time, the program is operated to supply through the data buses DB0–DB6 an indication data of "0" to a display device 6 which displays thereon the same data. At the same time, a CS terminal of the RAM-0 is set to a L level through the ports P24–P27 and the decoder IC-2 to select the RAM-1, whereas the output port P15 is kept remained at a L level to thereby turn on the analog switch IC-8 through the invertor IC-10. Under these conditions, if a user speaks an outgoing message into the microphone 8, an output therefrom is applied to an analog input terminal of the ADM circuit 7 through the amplifier 9 and the analog switch IC-8. At that time, since the output port P14 is set by program at a H level, a R/$\overline{W}$ terminal of the ADM circuti 7 is set at a L level through an invertor IC-9 so as to set the ADM circuit in its recording mode. In addition, since the analog switch IC-6 is turned on, the output from the microphone 8 supplied to the analog input terminal of the ADM circuit and then digitized therein is outputted from an analog output terminal of the ADM, and applied to an I/O terminal of the RAM-0 through the IC-6, to be written into the RAM-0. At this time, R/$\overline{W}$ terminals of the RAMs are set at a L level, respectively, in response to a predetermined output supplied from the output port P16 which is controlled by program, with the addresses A0 through A13 scanned by the counter IC-11 in which a count-up operation is performed in accordance with a pulse output supplied from the DB7. When the recording into the RAM-0 is executed for approximately 16 seconds so that the RAM-0 is fully loaded or filled with stored data (i.e., when it is determined by program that a counted number of pulses supplied from the DB7 reaches bit 256 K), the indication of "0" on the display device 6 is cancelled to notify that the recording is completed. At that time, the IC-11 is rendered reset by an output from the output port P17.

Next, in order to playback and listen to the outgoing message recorded in the RAM-0, the user depresses the OGM PLAY button 3. In the following, part of operations common to those mentioned above will be explained in a simplified manner. An associated output is now detected by the CPU 5, as mentioned above. As a result, on the display device 6 the indication of "0" is displayed, and the output port P14 is set at a L level so as to set the R/$\overline{W}$ terminal of the ADM circuit 7 at a H level through the invertor IC-9 so that the ADM circuit 7 is rendered operable in a playback mode. At the same time, the RAM-0 is selected in accordance with outputs from the output ports P24–P27 and the decoder IC-2, with the R/$\overline{W}$ terminal of the RAM-0 set at a H level in accordance with an output from the output port P16, so as to set the RAM-0 in a readout mode. Further, addresses A0–A13 are scanned by the use of the counter IC-11 which responds to a pulse output from the data bus DB7, so as to sequentially read out voice data from the I/O terminal of the RAM-0, to be supplied to the ADM circuit 7 via the analog switch IC-5. Furthermore, the voice data is subjected to a voice synthetic operation in the ADM circuit 7, and then the synthetic voice is outputted from an analog output terminal of the circuit and is supplied via the analog switch IC-4 and the amplifier 10 to a loudspeaker 11 by which the synthetic voice is reproduced, with a noise component thereof eliminated in the filter 14. Then, the indication on the display device 7 is cancelled upon completion of sound-reproduction, as mentioned above.

Next, when the push button (AUTO) 1 is depressed, the telephone answering device is set in a standby mode, with a register accommodated in the CPU for counting a number of incoming calls cleared by program. Upon reception of an incoming call through the terminals L1, L2, the CPU detects this through the photocoupler 15 and the test terminal TO, and operates to keep the relay Y-1 energized through the output port P20 and the buffer IC-12 so as to form a loop circuit through the contact y1-1 of the same relay. At the same time, the register is incremented by program. Further, the CPU operates to make an indication of "0" on the display device 6 and set the ADM circuit 7 in a playback mode, and further read out the data stored in the RAM-1 to produce an associated synthetic voice which is transmitted as outgoing message onto the telephone line through the filter 14, the analog switch IC-3, the amplifier 12 and the line transformer LT. Upon completion of transmission of the outgoing message, it is determined by program whether there is still any RAM having a remaining storage space. If so, the beep tone is transmitted by program from the output port P21, to notify a caller that the present device is switched to its recording mode. At that time, an indication of "1" is displayed on the display device 7, and the RAM-1 is switched to a write enabled state, with the ADM circuit 7 set its recording mode. As a result, an incoming call (ICM) sent from the caller is written into the RAM-1 through the line transformed LT, the amplifier 13, the analog switch IC-7, the ADM circuit 7 and the analog switch IC-6. Upon completion of this write operation, the relay Y-1 is restored by program to disconnect the loop circuit, so as to establish the standby state ready for a subsequent incoming call. On the other hand, if no RAM into which data can be written is present, no beep tone is transmitted, but another signal distinct from the beep tone is transmitted after transmission of the outgoing message, and hence the loop circuit is disconnected.

Next, when the push button 4 (ICM PLAY) is depressed in order to playback the incoming messages (ICM) recorded in the above manner, the indication of "1" is displayed on the display device, and at the same time the message recorded in the RAM-1 (channel 1) is reproduced. Then, the subsequent message in the RAM-2 (channel 2) is reproduced, with a channel number of "2" indicated on the display device. Upon completion of playback of all the RAMs, the display device is disabled, with no channel number indicated.

Figure 6A:
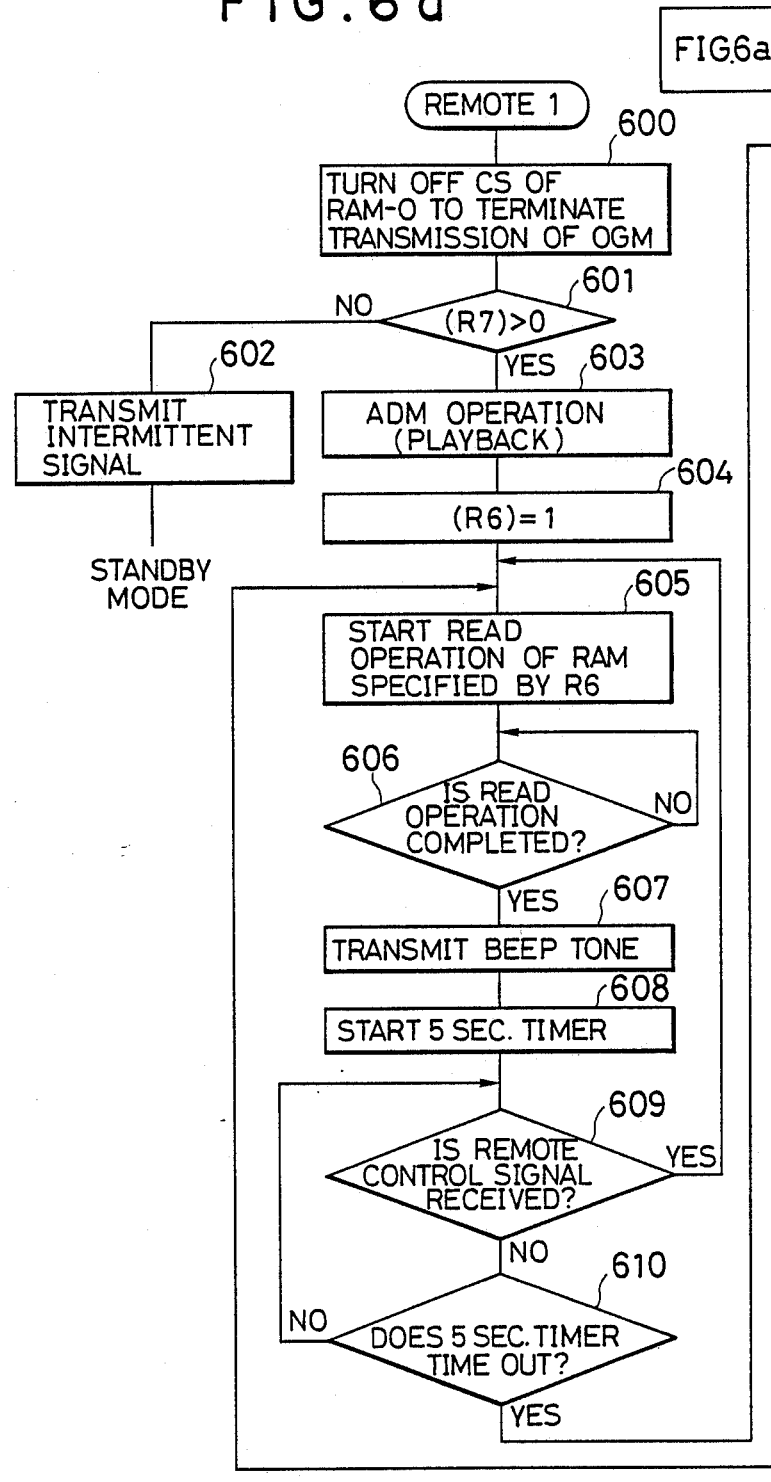

Next, with reference to the flowchart of FIG. 6, a remote control operation in the present invention will be explained.

First, the user at a remote place calls out the present telephone answering device and listens to the outgoing message (OGM) sent from the device in its AUTO mode. Thereafter, when the user sends a remote control signal, the same signal is supplied to the remote control signal detecting circuit 17 through the line transformer LT, the amplifier 13 and the buffer amplifier 16, to be detected by the detecting circuit 17. As a result, the CPU 5 is supplied with an interruption request through the encoder IC-1 and the INT terminal of the CPU, to advance the program to the step 600 of the flowchart shown in FIG. 6. In the step 600, the chip select terminal CS of the RAM-0 is set at a H level to render the RAM-0 disabled, so that the transmission of the outgoing message is terminated. Upon detection of termination of the message, the user stops transmitting the remote control signal. At the subsequent step 601, a test is made as to whether a content of a register R7 accommodated in the CPU 5 is larger than "0" or not. This register R7 is arranged to be cleared at the time the present device is set in its AUTO mode, and to store until which channel corresponding to one of the memories RAM-1 to RAM-7 the message recording has been made. Accordingly, in the event that no caller message has been recorded, the register R7 stored therein a value of "0". In this case, the program advances to the step 602 to transmit an intermittent signal from the output port P21 and restore the present device into the standby mode. On the contrary, in the event that the recording of caller message has been effected once or more, the program advances to the step 603 to set the ADM circuit 7 in its reproduction mode as mentioned above (to be set in a condition ready for reception of the remote control signal which can be transmitted in the recording mode). Next, at the step 604, a value of "1" is stored into a register as a counter, a register R6, for instance, and then the fetching from the RAM-1 (CH 1) is initiated (the step 605). The caller message stored in the RAM-1 is transmitted onto the telephone line through the same path as in the transmission of the outgoing message. At the subsequent step 606, the bit 256K of the RAM-1 is detected in the same manner as in the above-mentioned detection of the end point of the outgoing message. Further, the beep tone is transmitted for 1 second to notify that the reproduction for 1 channel has been completed. Thereafter, a 5 second timer is started by program so as to facilitate discrimination between messages and facilitate reception of a remote control signal (the step 608), and then a test is made as to whether a remote control signal is received until the 5 second timer times out (the steps 609, 610). When the remote control signal is received during operation of the 5 second timer, the flowchart returns to the step 605 to reproduce the caller message stored in the same memory again, which is usually called as back space operation. In the meantime, if the device is so arranged that the register R6 is decremented by one each time the remote control signal is received, the reproduction of a message specified at that time by the register R6 (the step 605) may be made by the back space operation. On the contrary, if no remote control signal is received within 5 seconds, the program advances to the step 611 to test whether stored values of the registers R6, R7 are consistent with each other. For instance, if messages of two calls (messages of two channels) have been recorded in the RAM-1 and the RAM-2 and the message recorded in the RAM-1 has been solely listened to by the use of remote control, stored values of the register R7 and R6 are "2" and "1", respectively. As a consequence, the program advances to the step 612 where the value of the register R6 is incremented by 1 and returns to the step 605 to initiate the recording of the RAM specified by the register R6, i.e., the RAM-2. When the contents of the registers R6 and R7 are consistent with each other, i.e., when the reproduction of all of the messages stored in associated RAMs is completed, the program advances from the step 611 to the step 613 where the 5 second timer is started. At the same time, transmission of an intermittent signal is started at the step 614. Further, a test as to a remote control signal is made at the step 615 until the 5 second timer times out at the step 616. If the remote control signal is received during this time, the transmission of the intermittent signal is stopped and immediately thereafter the device is restored in a standy mode, so that a caller message at a subsequent call will be stored into a next channel of RAM (normally called as an accumulate operation).

On the contrary, if no remote control signal is received before the 5 second timer times out at the step 616, the register R7 is cleared at the step 617, and thereafter the intermittent signal is terminated, and the restoration of the device takes place. As a consequence, a caller message at the subsequent call will be recorded in the RAM-1 of 1 channel, which is called as a O mode. Alternatively, the device may be so arranged to be set in the O mode upon reception of the remote control signal. Further, the 5 second timer associated with the step 608 may be omitted, wherein a separate section between callers messages is eliminated so that these messages are reproduced continually.

Figure 7B:
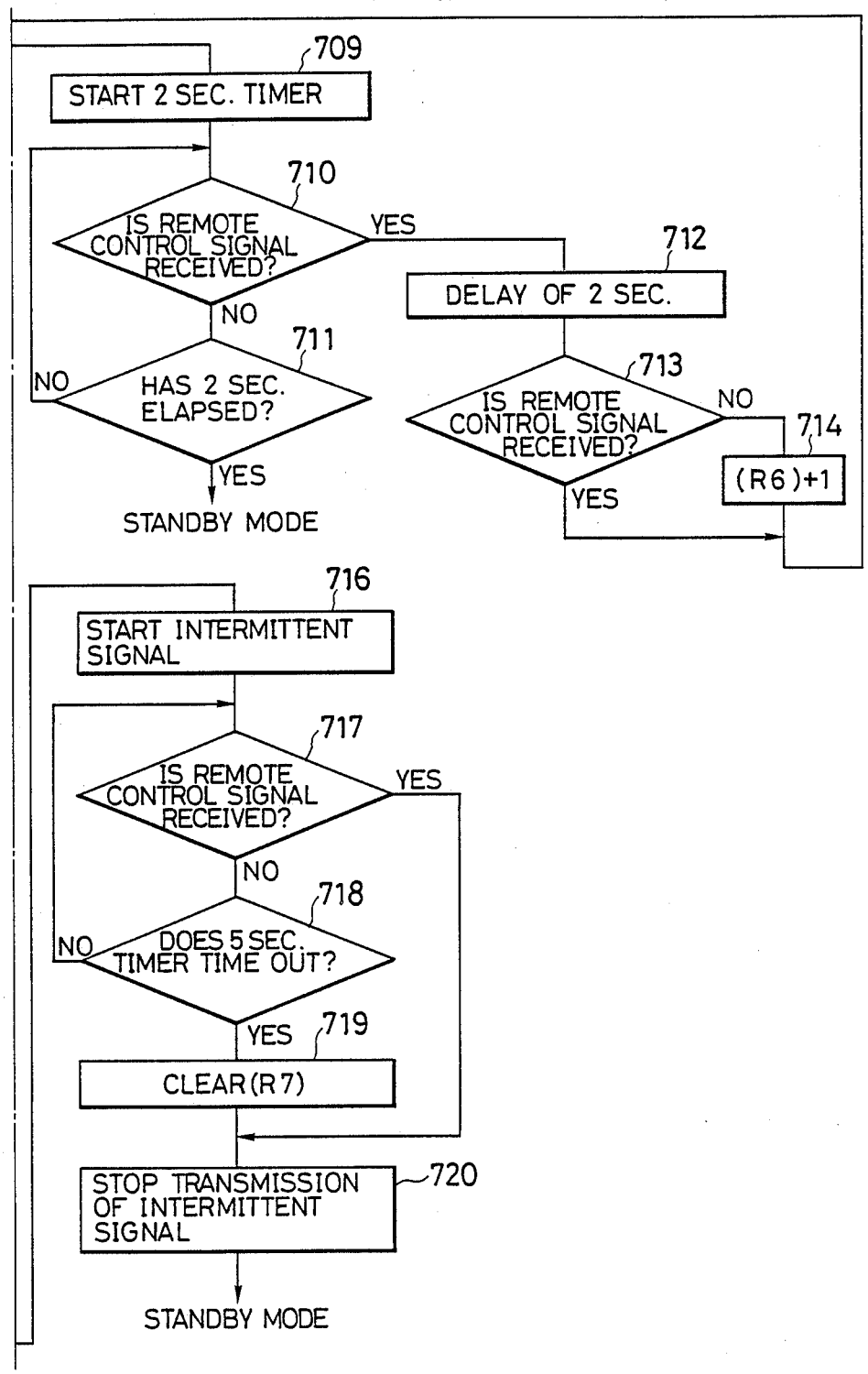

In the following, a second embodiment of the present invention will be explained with reference to the flowchart of FIG. 7. This flowchart is so arranged that, in reproducing callers messages (ICM) stored in the RAMs of respective channels, a beep tone is transmitted each time the reproduction for 1 message has been completed, and then a caller message stored in the RAM of next channel is reproduced if the caller sends the remote control signal within a predetermined period of time after listening to the beep tone, and that the device is immediately restored in its standby mode even when the caller cuts a phone during the time a message is listened to (in conventional devices using a tape, a considerable period of time is required to set the tape at its start position), and that recorded callers message are prevented from being erased, even if a subsequent call is received.

In the following, concrete functions will be explained, with explanations regarding parts common to those of FIG. 6 simplified. As mentioned above, transmission of the outgoing message (OGM) is blocked upon reception of a remote control signal during transmission of the same message (the step 700), and the present device is set to a standby mode through the step 702, if no caller message is recorded in the RAMs. On the other hand, if one or more caller messages are recorded, the ADM circuit is operated in its playback mode (the step 703), and then a value of "1" is stored into the register R6. Further, the reproduction associated with the RAM specified by the stored value of the register R6, i.e., the RAM-1, takes place (the steps 705 and 706). Upon completion of the reproduction, a test is made as to whether non-listened RAM is present at the step 707. If so, the beep tone is transmitted at the step 708, and thereafter a timer, a 2 second timer, for instance, is started at the step 709, and then a test is made at the step 710 as to whether a remote control signal is received or not. In the event that the caller cuts a phone for a reason such as urgent bussiness within 2 seconds, for instance, at the step 711, and thus no remote control signal is supplied, the device is restored to its standby mode immediately. Contrary to this, a remote control signal is supplied within this period of time, a test is made at the step 713 as to whether or not the remote control signal lasts more than 2 seconds, with a time delay of 2 seconds at the step 712. If the remote control signal is terminated within the 2 seconds, the register R6 is incremented by 1 at the step 714, and then the program returns to the step 705. As a consequent, a caller message stored in a RAM of a subsequent channel, i.e., the RAM-2 is reproduced (continued reproduction). On the other hand, the remote control signal is transmitted for more than 2 seconds at the steps 712 and 713, the program returns to the step 705, with the register R6 not incremented. As a consequence, the caller listens to again the message which he has listened to (back space operation). Thereafter, upon completion of remote listening of all the messages, the program advances from the step 707 to the step 715 et. seq., the O mode or the accumulate mode is established in accordance with an associated remote control and then the present device is restored in the standby mode, as mentioned with reference to FIG. 6.

Figures 8, 8A:
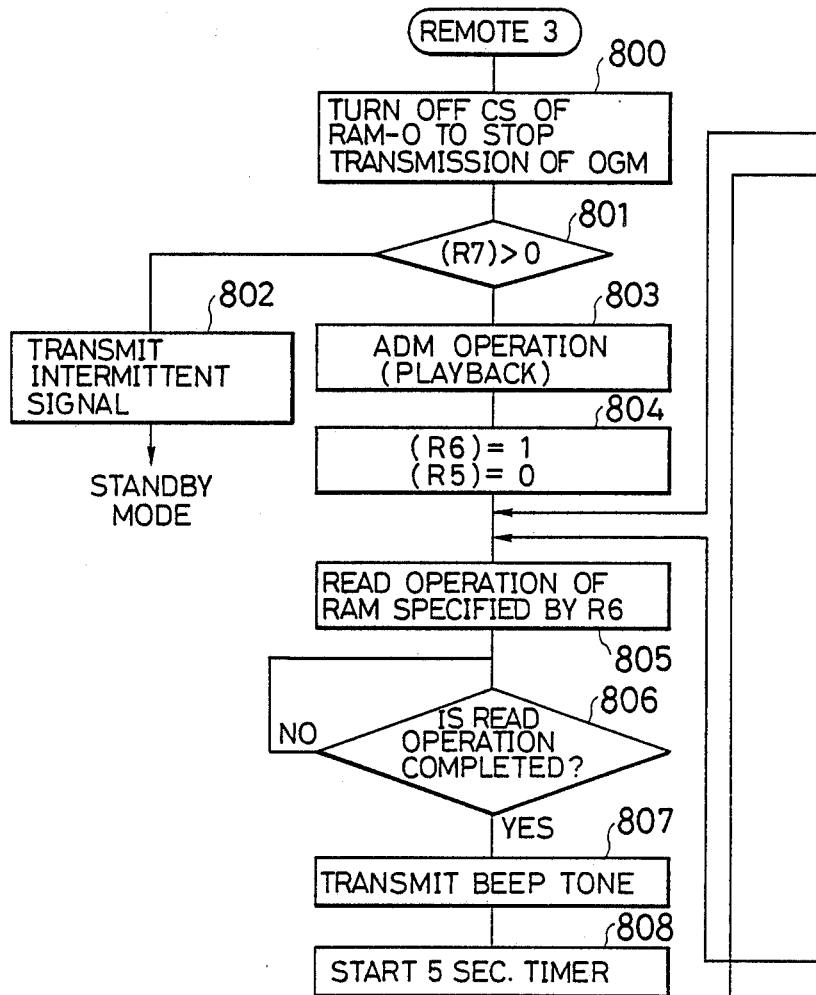
Figure 8B:
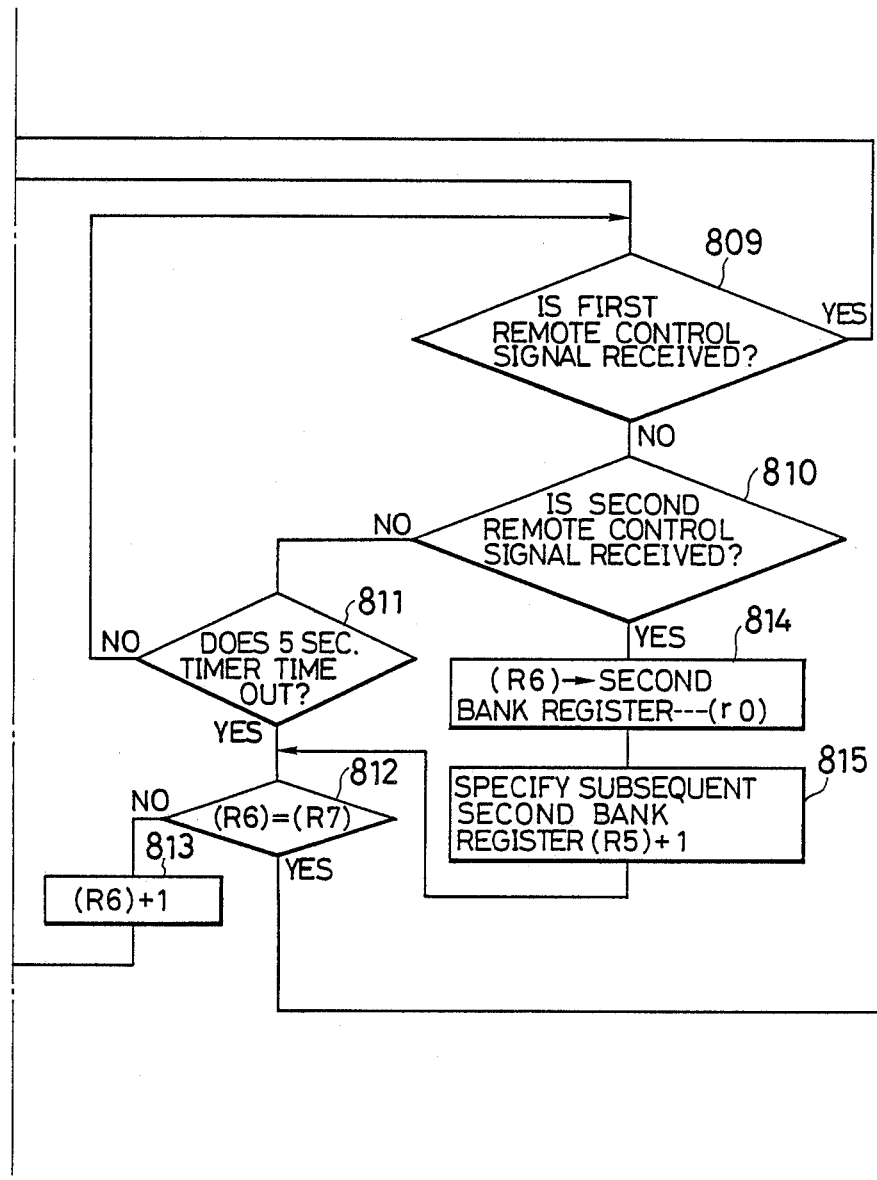

In the following, a third embodiment of the present invention will be explained with reference to the flowchart of FIG. 8. This flowchart is so arranged as to respond to a second remote control signal during the remote listening of caller message, the signal being transmitted by the user when he wishes to save a caller message which he has just listened to, so that one or more messages to be saved are kept reserved and further transferred to memories located at the low channel side, to be rearranged and saved therein, whereas one or more unnecessary messages are erased, upon restration of the present device. In the following, functions will be explained in a more concrete manner, and explanations common to aforementioned explanations will be simplified. At first, the present device is called out and a remote control signal (a first remote control signal) is sent during the transmission of the outgoing message (OGM), as mentioned above. Here, it is assumed that caller messages (ICM) are recorded in the RAMs. At first, a caller message recorded in the RAM-1 is reproduced, and thereafter, the program advances from the step 806 to the step 807 where the beep tone is transmitted. Next, the 5 second timer is started at the step 808, and tests are made at the steps 809 and 810 as to whether or not the first and second remote control signals are received, respectively, until when the 5 second timer times out at the step 811, the first remote control signal being the same as that of FIGS. 6 and 7, whereas the second remote control signal is newly provided for the flowchart of FIG. 8. This second remote control signal is supplied to the terminal D5 of the encoder IC-1 of FIG. 1, to be discriminated from the first remote control signal since a different output code is generated from the encoder in dependence on the fact that which of the first and second signals is supplied thereto. In the meantime, if it is not necessary for the user to listen to the caller message recorded in the RAM-1 again, no first remote control signal is to be sent. Further, transmission of the second remote control signal is unnecessary, if such message is not to be saved. When it is determined at the step 811 that 5 seconds have elapsed, the program advances from the same step to the step 812. If it is determined at this step that non-listened message is present, the register R6 is incremented by 1 at the setp 813 as mentioned above and then the program returns to the step 805. As a consequence, the message stored in the RAM-2 is now reproduced. In this case, a test regarding the second signal is also made at the step 810 upon completion of the reproduction of the message as mentioned above. If the user wishes to save this message, he should send the second remote control signal. Upon reception of this signal, the flowchart advances from the step 810 to the step 814 where the content of the register R6 is transferred to a second bank register (initially, r0). In the Intel 8048 (8748) accommodated in the present device has the R0 through R7 serving as first bank registers, and r0 through r7 as second bank registers. In the above case, a vaue of "2" is set in the register r0. Next, a subsequent register, i.e., r1, is specified at the step 815, and then the flowchart returns to the step 805 via the steps 812 and 813. As a result, the reproduction of the message of the RAM-3 is started. If it is unnecessary to save the same message of the RAM-3, the second remote control signal should not be sent. If the message of the RAM-4 reproduced sueceedingly should be saved, the associated second remote control signal should be transmitted. In this instant, the flowchart advances from the step 810 to the step 814 where a value of "4" is stored into the register r1 since the same register r1 has been specified at the step 815. Here, it is assumed that only caller messages of 4 calls are recorded. In the present case, when the flowchart advances through the step 815 to the step 812, respective values of the registers R6, R7 are consistent with each other, and hence the flowchart advances from the step 812 to the step 816. If it is determined at this step that the first remote control signal is supplied, the above-mentioned O mode is established, whereas, if the message is to be saved as in the present case, the user may take the phone on-hooked without transmitting the first remote control signal. The flowchart advances through the step 822 to the step 823 when it is determined at the step 819 that 5 seconds have elapsed. At the step 823, a search is made as to whether the RAM-1 is specified in the second bank resisters r0 through r7, i.e., whether a value of "1" specifying the RAM-1 is stored or not in these registers r0 –r7 is tested. In the present case where a decision is made such that the content of the RAM-1 should not be saved, and hence the value of "1" is not stored in the registers. As a consequence, the flowchart advances from the step 823 to the step 831 where all of 256K bits of the RAM-1 including the caller message are erased. At the subsequent step 824, the value of the second bank registers r0-r7 are tested so as to check whether a value of "2" specifiying the RAM-2 is stored. In the present case where the value of "2" has been stored in the register r0, the message in the RAM-2 is not erased, and the flowchart advances to the next step 825 (not shown). Thereafter, the above-mentioned operation is repetitively carried out so that the RAMs including messages to be saved are not cleared whereas messages not to be saved are cleared. Then, the flowchart advances to the step 840 where the RAM messages to be saved are transfered to the RAMs at the lower channel side. In the present case, the message contained in the RAM-2 is transferred to the RAM-1, and the message contained in the RAM-4 is transfered to the thus cleared RAM-2. Upon completion of the transfer, the program advances to the step 841 to clear all of the used second bank registers. Next, at the step 842, the value of the register R5 is stored into the register R7. Since the former register R5 is operated to count at the step 815 the number of the second bank registers in use, i.e., the number of messages to be saved, and the value stored therein is now introduced into the register R7, a caller message at a subsequent incoming call will be recorded in the RAM next to the saved messages.

In the above-mentioned embodiment, a constant memory capacity is assigned for recording a caller message. However, an address representative of a boundary between caller messages may be stored by the use of means for detecting disconnection of a phone by the caller, so that a memory capacity may be assigned in dependence on the length of a caller message.

In the aforementioned explanation, the caller messages are stored in the memories in units of channel, that is, each caller message is recorded in the memory (RAM) having a constant capacity. As a result, if the caller message is shorter than the maximum allowable recording time period determined by this memory capacity, an uselessness occurs in the memory. In a second embodiment of the present invention, the above-mentioned recording memories disposed in units of channel are treated as if they are continuous to each other, and an on-hook operation effected by the caller is detected by a voice control circuit (so-called VOX circuit, not shown) when the recording of caller message is completed, or detected by a photocoupler 15 for detecting a pulse which is generated upon on-hook operation, so as to release a loop and at the same time store into a RAM of the CPU the end address of the recording memory which is used for that message recording, the end address being read out to know the boundary between associated messages. In this second embodiment where two kinds of RAM are employed, the RAMs corresponding to ones in the first embodiment is referred to as the recording memories (RAMs) so as to be distinguished from the RAM in the CPU, or avoid confusion. In the meantime, the RAM in the CPU is of 63 bytes in the Intel 8048, and is of 126 bytes in Intel 8049, and specified indirectly by the registers R0, R1 accommodated in the CPU.

Figure 9:
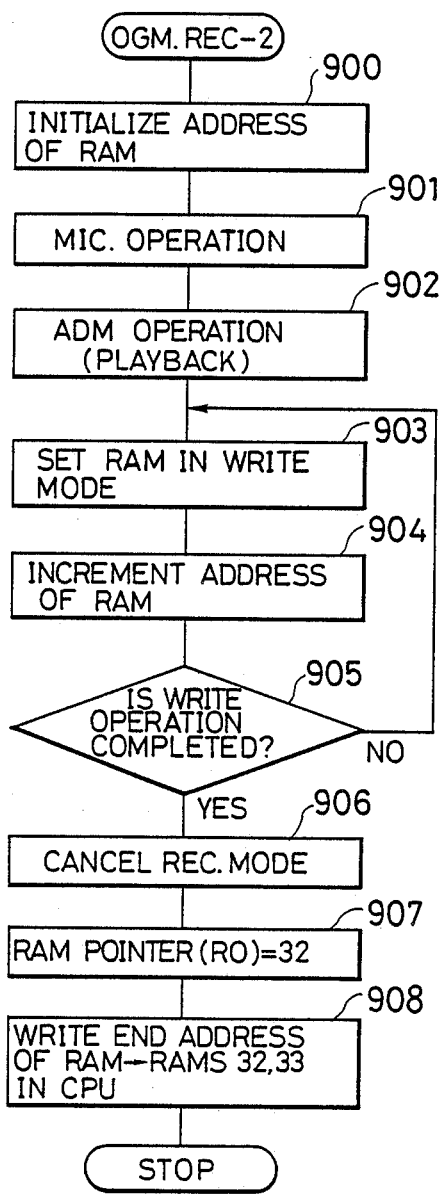
FIG. 9 is a flowchart describing a second embodiment of the invention.
Figure 10B:
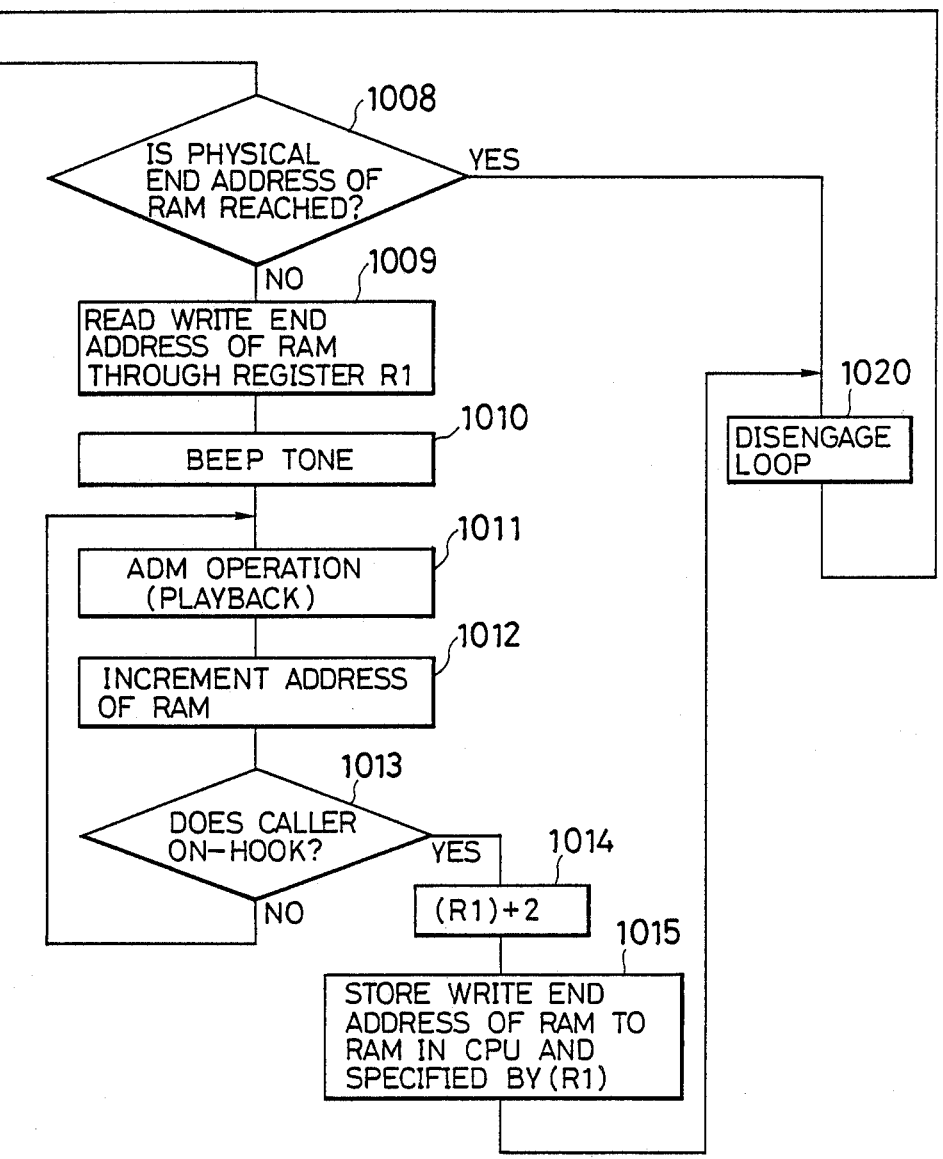

Next, a further concrete explanation will be given with reference to FIGS. 9 and 10, wherein portions common to those mentioned above will be omitted. At first, the addresses of the recording memories (RAMs) are initialized at the step 900 so that recording of the outgoing message is started at a start address of an associated recording memory (RAM). More specifically, an address counter IC-11 is reset and at the same time output ports P24 thorugh P27 are set at their L levels so as to specify via the decoder IC-2 the associated recording memory (RAM), i.e., the RAM-0. Next, a microphone is activated as mentioned above (the step 901), and the ADM circuit 7 is set at its recording mode (the step 902). Further, the recording memory (RAM) is in its write mode as shown in the steps 903 through 905 until when the recording of the outgoing message is completed, and the address of the memory is incremented in accordance with a predetermined sampling frequency to renew the write location in the memory. To complete the write or recording operation, the user depresses a recording button 2 again, or depresses a playback button 3, for instance. Alternatively, a recording cancel button may be provided.

Upon completion of the outgoing message recording effected in this manner, the recording mode is cancelled at the step 906 and then a value of 32 is substituted into the register R0 accommodated in the CPU and serving as a RAM pointer (the step 907), and further the write end address in the recording memory (RAM) in the form of 16 byte data is stored into the 32 RAM in the CPU specified by the register R0 and the RAM next thereto, i.e., the RAMs 32 and 33. In the meantime, RAM0 through RAM31 in the CPU are employed as registers.

The outgoing message recorded in the above manner is reproduceable up to the associated address stored in the RAMs 32, 33 in the CPU. A detail therefor will be apparent from the aforementioned recording operation of the outgoing message and the explanation given with reference to FIG. 3, and thus will be omitted.

Next, with reference to FIG. 10, an explanation will be given in case that the present device is set at its automatic answering/recording mode. As mentioned in FIG. 4 of the first embodiment, the present device is set at the standby mode upon depression of a push button 1 (AUTO). At first, the stored value (R0) of the register R0 is transferred (as mentioned later) to the recording register R1 at the step 1000, and the address of the recording memory (RAM) is initialized in a manner mentioned in FIG. 9 (the step 1001). Then, the device waits for reception of an incoming call at the step 1002. Upon reception of the incoming call, a loop of the telephone line is formed, and the ADM circuit 7 is operated in a reproduction mode, and further the outgoing message (OGM) is transmitted, with the address of the recording memory (RAM) incremented, until the end address of the outgoing message (OGM) is reached, which address is stored in the RAMs 32, 33 in the CPU as explained with reference to the step 908 (the steps 1004–1007). After transmission of the outgoing message, a test is made at the step 1008 as to whether the physical end address of the recording memories (RAMs) has been reached or not. If the physical end address is reached, no caller message is recordable, and thus the flowchart advances to the step 1020 where the loop is disconnected, and the standby mode is established at the step 1002 to which the program advances via the step 1001, without generation of the beep tone for requesting the recording operation since the program does not passes through the step 1010.

On the other hand, unloaded or empty spaces are still present in the recording memories (RAMs), the flowchart advances to the step 1009 where the stored value of the register R1 is read out, and, in accordance with the value stored in the RAM of the CPU specified by the thus read value, the end address of the recording memories (RAMs) is read out. More specifically, since the value of 32 has been stored in the register R0 at the step 907 and transferred to the register R1 at the step 1000, the stored value in the register R1 now equals to 32. Accordingly, if no caller message has been recorded, the value of 32 is the register R1 is kept unchanged at the step 1009, and the end address of the outgoing message stored in the RAMs 32, 33 in the CPU, which is specified by this value, equals to the end address of the outgoing message mentioned with reference to FIG. 9. Accordingly, the caller message sent for the first time is recorded into the memory area next to the end address of the outgoing message, and this recording mode is cancelled upon detection of the onhook operation effected by the caller at the step 1013. Upon cancellation of the recording mode, the stored value of the register R1 is incremented by 2 (the step 1014). Accodingly, the value in the register R1 is set to 4 when the recording of the caller message sent for the first time is completed, and the end address is written into the RAM in the CPU specified by this value, i.e., the RAMs 34 and 35, at the step 1012. In the meantime, a value appearing at the output ports P24–P27 is written as part of the address into the RAM in the CPU specified by the register R1. Next, a loop is disengaged at the step 1020 and then the device is restored in the standby mode.

The above-mentioned operation is repeated each time an incoming call is received. As a consequence, the end address is written in such a manner that the end address of the caller message sent for the first time is written into the RAMs 34 and 35 in the CPU, and the end address of the caller message sent for the second time is written into the RAMs 36 and 37. Accordingly, even in the case of remote control operation, the operation can be made in units of channel by reading out the address stored in associated RAMs in the CPU. Accordingly, the second emboidment, where the control is carried out as if the recording memories (RAMs) are continuous to each other, is analogous in principle to the remote control operation in the first embodiment where the rocording memories are employed in units of channel. Thus, a flowchart for remote control operation in accordance with the second embodiment will be omitted.

As mentioned above, the present invention provides excellent functions which make it possible to perform a jump over empty spaces in a storage device in which a digitally synthesized voice is recorded in a manner capable of being read out, and either to prevent reception of an incoming call, or to switch to an integrated circuit used solely for answering, if the storage device is fully loaded, when the storage device is remote-controlled from a remote place through telephone line. This is applicable not only to an automatic telephone answering/recording device, but also to other objects for permitting a listening operation of stored messages through a remote control.

What is claimed is:

1. An automatic telephone answering/recording device, comprising:
    means for converting an outgoing message recorded in a RAM (random access memory) in digital form into an analog signal for transmission thereof onto a telephone line;
    means for recording messages from a number of unspecified callers in separate message channels, i.e., within different memory portions of said RAM having a common message storage capacity;
    means for playing back messages from up to said number of the unspecified callers, channel by channel, in accordance with a first remote control signal sent by a user of said device from a remote place;
    means for providing a blank portion between messages stored in said RAM each time playback of a channel for a message from the unspecified caller is completed;
    means for permitting playback of a message from another unspecified caller upon elapse of the blank portion;
    means for receiving a second remote control signal from the user when remote listening of a message is completed;
    message number storage means for storing a message number corresponding to a message which needs to be stored in accordance with reception of the second remote control signal;
    erase means for erasing a message which is not stored in said message number storage means and no longer needs to be stored upon restoration of said device to a standby mode thereof; and
    transfer/storage means for successively transferring messages specified by message numbers stored in said message number storage means to a fill location at which a message erased by said erase means was stored.

2. A device according to claim 1, wherein when playback is performed channel by channel, boundaries of each message are removed so as to eliminate spacings therebetween.

3. A device according to claim 1, including means responsive to at least one particular remote control signal sent during a remote control listening mode of operation for "backspacing" to reproduce a previous message.

4. A device according to claim 1, including means for selecting between a zero mode (a mode wherein a subsequent message sent from an unspecified caller is recorded in an initial part of the RAM) and an accumulate mode (a mode wherein a message sent from an unspecified person is recorded next to an unspecified person's message which has been most recently listened to), and then restoring said device in the standby mode.

5. A device according to claim 1, wherein a particular signal is sent onto the telephone line each time a playback of an unspecified person's message through remote control is completed, and in accordance with the particular signal, a subsequent message is permitted to be reproduced by a remote control signal sent by the user.

6. A device according to claim 1, including means responsive to a second remote control signal for storing a corresponding message and means responsive to an absence of said second remote control signal for erasing said corresponding message.

* * * * *